(12) United States Patent
Healy et al.

(10) Patent No.: US 7,182,223 B2
(45) Date of Patent: Feb. 27, 2007

(54) DETACHABLE TUBE ASSEMBLY

(75) Inventors: Brian E. Healy, Hartland, WI (US); Nathan R. Westphal, Racine, WI (US)

(73) Assignee: S.C. Johnson & Son, Inc., Racine, WI (US)

(*) Notice: Subject to any disclaimer, the term of this patent is extended or adjusted under 35 U.S.C. 154(b) by 502 days.

(21) Appl. No.: 10/812,118

(22) Filed: Mar. 29, 2004

(65) Prior Publication Data

US 2005/0224517 A1  Oct. 13, 2005

(51) Int. Cl.
*B65D 83/16* (2006.01)

(52) U.S. Cl. .................... 222/174; 222/191; 222/402.1

(58) Field of Classification Search ............... 222/174, 222/191, 402.1
See application file for complete search history.

(56) References Cited

U.S. PATENT DOCUMENTS

| | | | |
|---|---|---|---|
| 2,815,522 A | | 12/1957 | Hexter |
| 3,791,624 A | | 2/1974 | Payson |
| 3,856,209 A | * | 12/1974 | Hickson ..................... 239/532 |
| 4,577,837 A | * | 3/1986 | Berg et al. .................. 254/212 |
| 6,155,741 A | | 12/2000 | Took |
| 6,213,677 B1 | | 4/2001 | Yamane et al. |
| 6,540,424 B1 | | 4/2003 | Hall et al. |
| 6,845,923 B1 | * | 1/2005 | Slotsve ....................... 239/376 |
| 6,868,989 B2 | * | 3/2005 | Fahy et al. ................. 222/174 |
| 2001/0010778 A1 | | 8/2001 | Hilton et al. |
| 2003/0053846 A1 | | 3/2003 | Kopanic et al. |
| 2003/0235463 A1 | | 12/2003 | Neumann et al. |

* cited by examiner

*Primary Examiner*—Joseph A. Kaufman

(57) ABSTRACT

Detachable tube assemblies, such as those useful in remote spraying devices, are disclosed. The assemblies use a U-shaped coupling device having a base with a central aperture, flexible arms, and radial extensions. The radial extensions interfit with alignable radial holes on tubes to be coupled together. The central aperture guides and aligns an actuator rod. The rod can be used to remotely actuate a spray.

8 Claims, 4 Drawing Sheets ial aperture of the second tube when the first and second tubes are telescoped together. There is also a coupler having a base portion with a central aperture suitable for receiving and guiding a rod therein, at least one flexible arm coupled to the base portion, and a first radial extension extending outwardly from the arm, the extension being sized and dimensioned to be received in aligned radial apertures of both the first and second tubes to thereby couple the tubes together.

DETACHABLE TUBE ASSEMBLY

CROSS REFERENCE TO RELATED APPLICATIONS

Not applicable

STATEMENT REGARDING FEDERALLY SPONSORED RESEARCH/DEVELOPMENT

Not applicable

BACKGROUND OF THE INVENTION

The invention relates to a device for detachably coupling tubes together, and more particularly for detachably coupling tubes for use as part of a handle and actuator system for a remote spray assembly.

Common aerosol cans and similar pressurized spray canisters are most frequently actuated by a user directly pressing a button or other structure that activates the can's valve. Typically, this means that the user must directly hold the canister in his or her hand, and the surface to be sprayed must be no further away than can be reached by the spray pattern of the canister.

This will present problems for some applications. For example, except for some specialty sprays designed to project a narrow stream a long distance (such as certain conventional wasp sprayers), most common aerosol sprays tend to fan out quite quickly. Consequently, a user cannot apply the spray to a small, localized area such as a window sill, an area under a bush or other plant, or the like, unless the can (and therefore the user's hand) can be within inches of the target area.

In any event, many users would prefer to keep their distance from certain sprays, such as pesticides, regardless of the capability of the sprayer. Even when there is no danger in the proper use of the pesticide, they desire separation simply as a matter of aesthetic preference.

Because of these and other issues, devices for spraying a remote target or area have been developed, such as those described in U.S. Patent Application Publication US 2003/0053846, the disclosure of which is hereby incorporated by reference as if fully set forth herein. This application describes a device for spraying pesticides, agricultural treatment chemicals, and/or other chemicals, the device having a housing configured to retain a spray canister, an actuator rod on the housing, a shaft connected to the housing, and a linkage to trigger the spray canister to effectuate remote spraying.

While this device is very useful for maintaining a distance between a user and the chemical being sprayed, the tube segments which make up the shaft were designed for permanent assembly. Thus, it can be difficult to disassemble the tubes for maintenance and/or other reasons such as more compact storage between uses.

Some devices for providing a detachable connection between tubes in a tubular shaft are known in the art. One common method for locking two tubes together is shown, for example, in U.S. Pat. No. 2,815,522. Here, a resilient pin is directly affixed to the inside of one tube and springs outward through a hole in that tube, and then, upon assembly, through a hole in the next tube. However, the installation of the pin can be somewhat costly, and can be somewhat difficult to manufacture in a consistently reliable manner.

Another device with coupling features was disclosed in U.S. Pat. No. 3,791,624. There, a flexible coupler was used for detachably coupling adjacent tubes. The coupler had a pair of outwardly directed flexible prongs which can be compressed and then detachably inserted into corresponding holes on an adjacent piece of a multi-segment cleaning member. While this device did serve a coupling purpose, there were no means provided for aligning, retaining, and guiding an axially movable member, as required for triggering a spray canister remotely.

U.S. Pat. No. 6,155,741 showed a coupling device having outward projections for detachably coupling to a rectangular rail which included a central bore for retaining an axial member. Here, however, the coupling device was coupled only to a single rail, and is therefore not useful for coupling a pair of tubes or rails together.

Similarly, U.S. Pat. No. 6,213,677 illustrated a coupling device in which prongs radially extend through a single tubular member.

Thus, a need still exists for an improved detachable tube assembly, particularly one useful in a remote sprayer.

SUMMARY OF THE INVENTION

The present invention provides a detachable tube assembly. The assembly has first and second tubes, the first tube having at least one radial aperture which is alignable with a rad In preferred forms the coupler has two such flexible arms/extensions, and an actuator rod is movably positioned in the central aperture. The rod includes a radial barb for limiting the extent of axial movement of the rod in the central aperture and extends through the first and second tubes. The barb also is configured to facilitate assembling the rod with the coupler by movement of the rod in one axial direction relative to the central aperture. The rod may also have a washer mounted thereon to facilitate centralization of the rod along a central axis of one of the tubes.

In another aspect the invention provides a coupler for detachably connecting first and second tubes, the first tube having at least one radial aperture which is alignable with a radial aperture of the second tube when the first and second tubes are telescoped together. The coupler has a base including a central aperture suitable for receiving and guiding a rod therein, at least one flexible arm coupled to the base, and a radial extension extending outwardly from the arm.

In yet another aspect the invention provides a spraying device which has a trigger assembly, a first tube having two radial holes, and a second tube having two radial holes. The first and second tubes are telescoped into one another with the radial holes of the first tube being in alignment with the radial holes of the second tube.

The spraying device also has an actuator rod assembly coupled to the trigger assembly and extending through the first and second tubes in an axially movable fashion. There is also a spray canister assembly linked to the second tube and adapted to be activated by the actuator rod, and a coupling device positioned in a tube adjacent a junction between the first and second tubes.

Most preferably, the coupling device has a base section having a central aperture, first and second flexible arms extending from the base section, and first and second radial extensions extending from the first and second flexible arms, respectively. The actuator rod also extends through the central aperture in axially movable fashion and the radial extensions extend into the two radial holes of the first tube and the two radial holes of the second tube.

As will be appreciated from the following description, the coupler of the present invention serves multiple functions. First, it serves to align and guide the central actuator rod, yet do so in a manner where the rod's axial movement is limited to a defined range. Further, the device self-assembles to the rod within which it is inserted. Finally, the coupler also simultaneously links to the second tube, thereby providing a coupling function between the first and second tubes.

The coupler is extremely low cost to produce, easy to install, and easily conceptually understood by consumers who will use it. Further, it insures that the connection between the tubes is not a permanent one if disassembly is desired.

These and other advantages of the invention will appear from the following description. In this description, reference is made to the accompanying drawings, which form a part hereof, and in which there is shown by way of illustration, a preferred embodiment of the invention. Such embodiment and its particular advantages do not define the full scope of the invention. Thus, reference should be made to the claims for interpreting the full scope of the invention.

DETAILED DESCRIPTION OF THE PREFERRED EMBODIMENT

Figure 1:
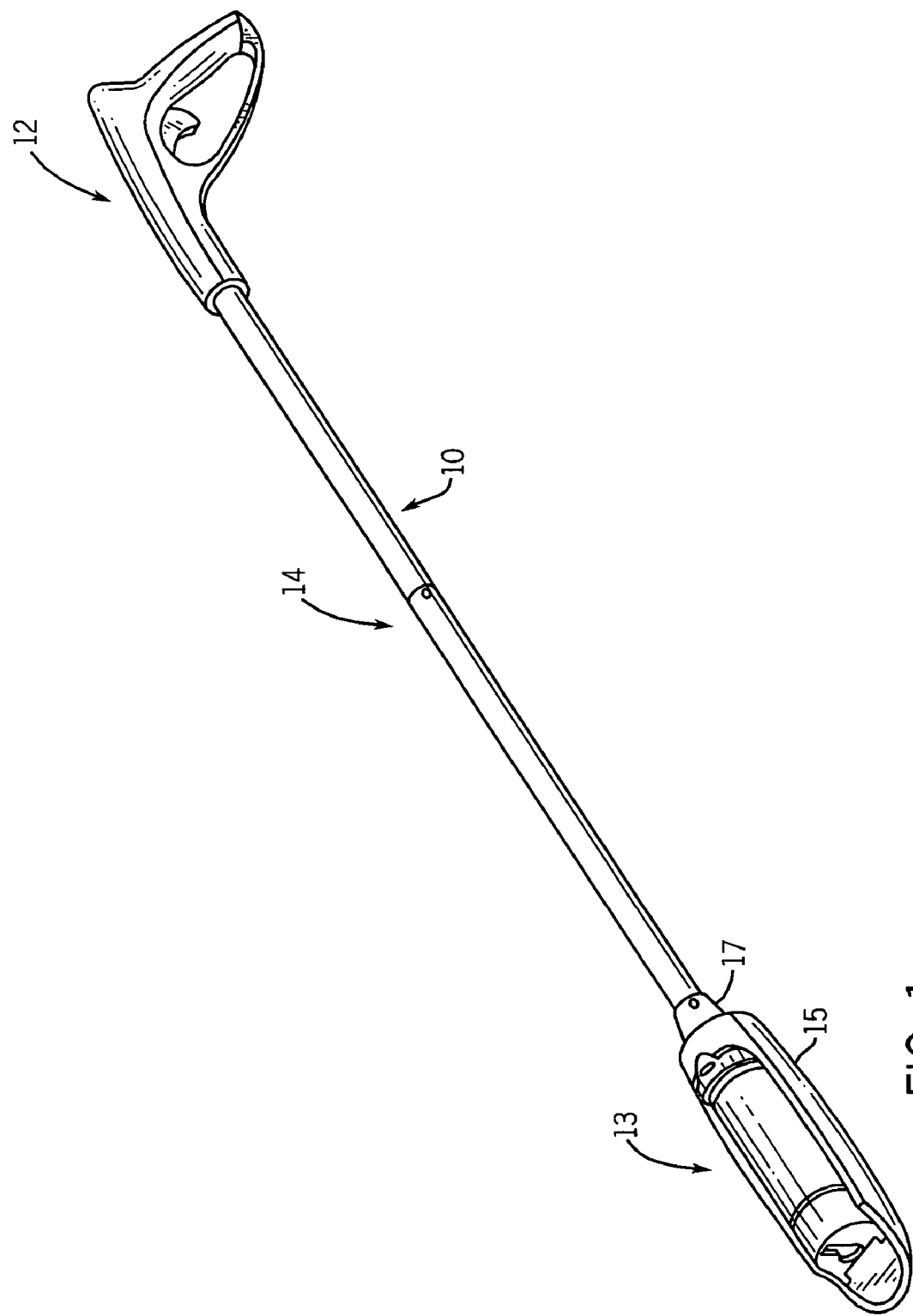
FIG. 1 is a front, right, bottom perspective view of a sprayer device constructed in accordance with the present invention.

Referring first to FIG. 1, a sprayer device is shown including a handle assembly 10 for attachment to a canister assembly 13. There is a canister housing 15 for receiving an aerosol can containing a pesticide, insecticide, agricultural chemical, or other chemical to be sprayed. The housing 15 includes a connecting portion 17 which is tubular in shape, and which is detachably connectable to the handle assembly 10, as described below.

Figure 2:
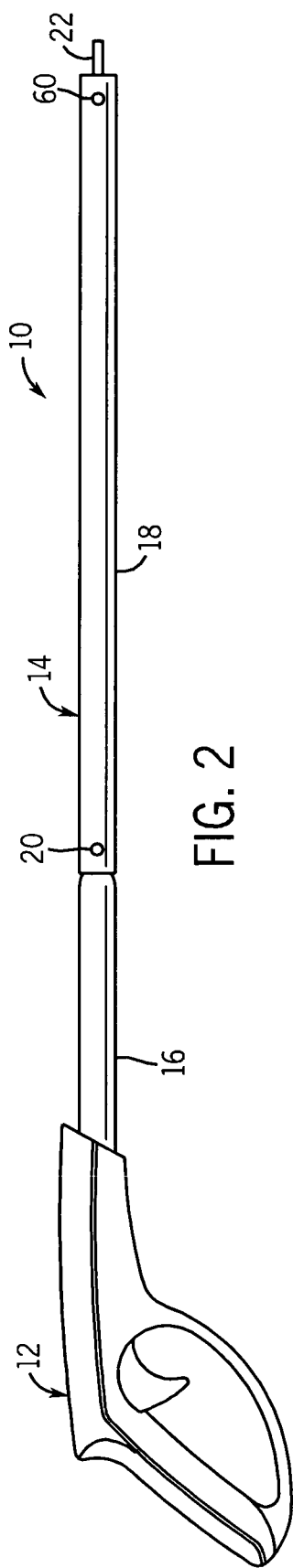
FIG. 2 is a left side view of a top portion of the FIG. 1 sprayer device.
Figure 4:
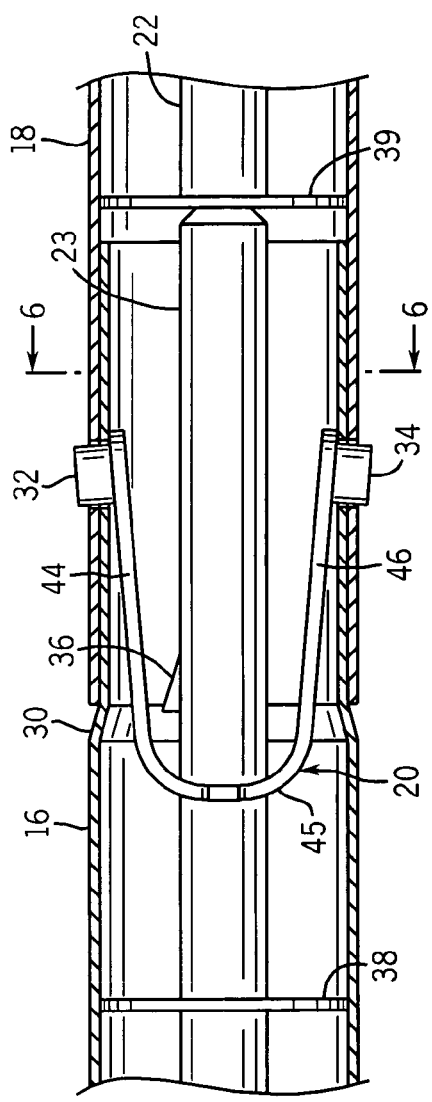
FIG. 4 is a partial sectional view of the assembled FIG. 3 parts.

Referring next to FIG. 2, the handle assembly 10 includes a trigger assembly 12 for actuating an actuator rod 22, and a shaft assembly 14. The shaft assembly 14 is constructed of an upper tube segment 16 and a lower tube segment 18 which are detachably coupled together with a coupling device 20. The tubular connector portion 17 of the housing 15 (FIG. 1) is similarly detachably coupled to the lower tube segment 18 with a second coupling device 60.

The actuator rod 22 is provided within the shaft assembly 14 and is activated by the trigger assembly 12 to actuate the spray canister 13 (FIG. 1) for dispensing the chemical as described in U.S. Patent Application Publication 2003/0053846.

Figure 3:
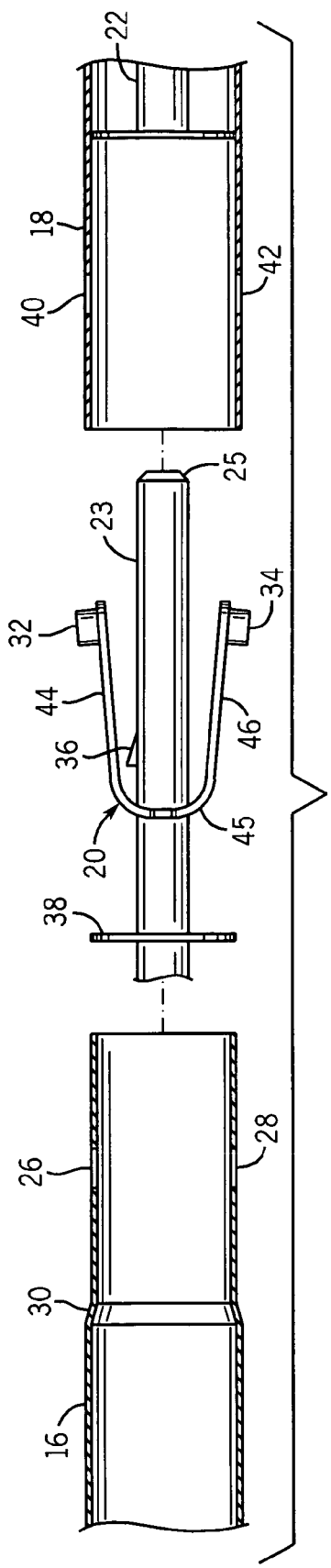
FIG. 3 is a partial exploded view of a portion of the FIG. 2 structure, with particular focus on the junction between tube segments.

Referring now to FIG. 3, upper tube segment 16 includes a tapered portion 30 in which first and second radial holes 26 and 28 are provided on opposing sides of the tube. An actuator rod segment 23, which links to the trigger assembly 12 for triggering and activating the spray canister 13, is provided in the upper tube 16, and includes a tapered end 25 for receipt in the next actuator rod segment 22. The actuator rod segment 23 includes a one-way barb 36 which extends radially from the rod and is triangular in shape such that the coupling device can be moved over the barb in one direction, but not easily moved back.

The actuator rod segment 23 also includes one or more integral washer portions 38 sized and dimensioned to maintain the actuator rod segment 23 in an axial centered position within the upper tube segment 16. The washer segment 38 can alternatively be a separate element slideably received on or coupled to the actuator rod segment 23.

Similarly, the lower tube segment 18 also includes first and second radial holes 40 and 42 provided on opposing sides of the tube 18 and adjacent an end of the tube 18 intended to be coupled to the tube 12. The radial holes 26, 28, 40, and 42 are all sized and dimensioned to receive radial extensions 32 and 34 extending from the coupling device 20. The actuator rod segment 22 provided in the lower tube segment 18 includes a contact surface 21 (FIG. 7) for receiving the tapered end 25 of the actuator rod segment 23, and can also include one or more washer 39.

Figure 5:
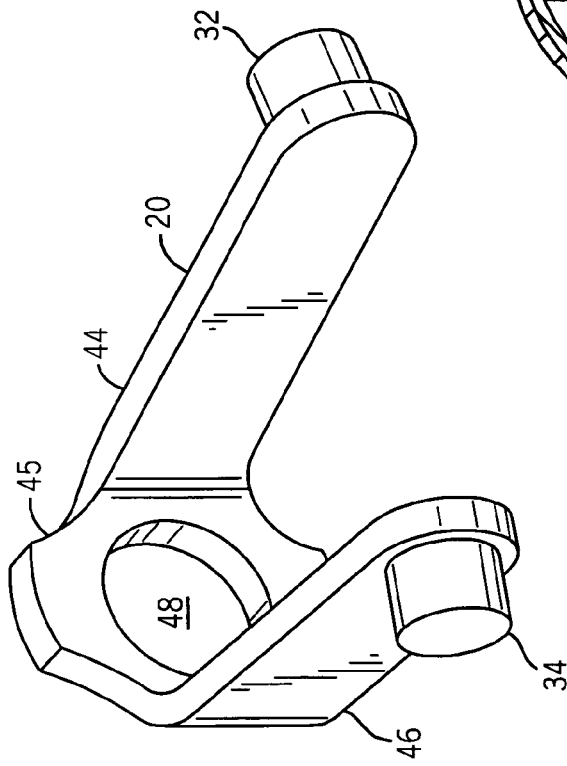
FIG. 5 is a perspective view of the coupler shown in FIG. 4.

Referring now also to FIG. 5, the coupling device 20 is substantially U-shaped in front view, and includes a base section 45 from which first and second flexible arms 44 and 46 extend. Radial extensions 32 and 34, which, as shown, can be cylindrical in shape, extend outwardly from each of the flexible arms 44 and 46 and are sized and dimensioned to be received in the radial apertures 26, 28, 40, and 42 in the tubes 16 and 18. A center aperture 48 is provided in the base section 45, and is sized and dimensioned to receive the actuator rod segments 22 and 23, and to align the actuator rods 22 and 23 in the tubes 16 and 18. The coupling device 20 is constructed of a material such as a plastic which allows the arms 44 and 46 to flex.

Referring next to FIG. 3, to assemble the tubes 16 and 18 onto the coupling device 20, the coupling device 20 is initially inserted into the tapered portion 30 of the upper tube segment 16 and the flexible arms 44 and 46 are flexed inward and released when the radial extensions 32 and 34 are aligned with the radial holes 26 and 28, respectively. The coupling device 20 is positioned on the actuator rod segment 23 such that the one-way barb 36 is positioned between the coupling device 20 and the end of the tube 16, with the barb 36 directed such that the vertical edge of the ramped barb faces the base 45 of the coupling device 20 so that the one-way barb thereafter prevents the coupling device 20 from being pulled off of the actuator rod segment 23.

One may first position the coupling device 20 on the actuator rod segment 23 and then insert that subassembly into a tube segment such as the upper tube segment 16 until the radial extensions 32 and 34 align with and become engaged in the radial holes 26 and 28. Alternatively, the coupling device 20 may first be positioned within the tube segment 16, with the radial extensions 32 and 34 engaged in the radial holes 26 and 28, the actuator rod segment 23 then being inserted within the tube segment to at the end remote from the coupling device to pass through the center aperture 48.

After the coupling device 20 is received in the upper tube segment 16, the lower tube segment 18 is aligned over the upper tube segment 16, the flexible arms 44 and 46 are flexed inward to allow the lower tube segment 18 to be moved over the tapered portion 30 of the upper tube segment 16 and, when the radial holes 40 and 42 in the lower tube segment are aligned with the radial extensions 32 and 34 in the coupling device 20, the flexible arms 44 and 46 are released, wherein the radial extensions 32 and 34 move into the radial holes 40 and 42 coupling the upper tube segment 16, the lower tube segment 18, and the coupling device 20 together.

To maintain the actuator rod segments 22 and 23 in a centered position within the upper tube segment 16 and the lower tube segment 18, the actuator rod segments 22 and 23 can include one or more washer 38 and 39, where the washers 38 and 39 are sized and dimensioned with a radius slightly smaller than the diameter of the tubes 16 and 18 to maintain the actuator rod 22 at an axial center of the tube segments 16 and 18, and therefore aligned between the trigger assembly 12 and the canister 13.

Figure 6:
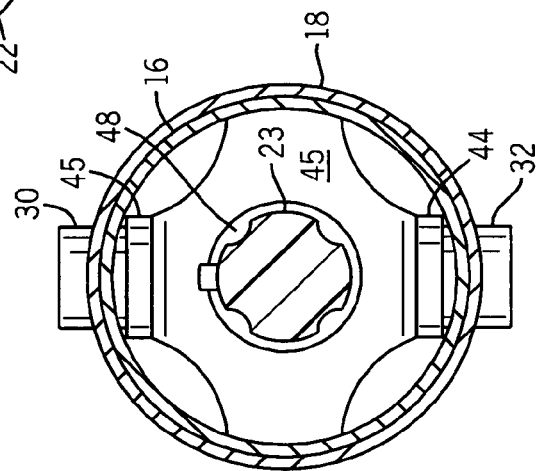
FIG. 6 is a sectional view taken along the line 6—6 of FIG. 4.

Referring next to FIG. 6, actuator rod segment 22 is provided through the center aperture 48 of the coupling device 20 and that the radial extensions 32 and 34 extend through pairs of aligned apertures 28 and 42 and 26 and 40, respectively, coupling the upper tube 16 to the lower tube 18. The one-way barb 36 prevents the coupling device 20 from moving along the actuator rod segment 23 and therefore maintains the coupling device 20 within the tube segment 16. The actuator rod segment 22 is aligned with and mated to the actuator rod segment 23 which, as described above, provides a linkage between the trigger assembly 12 and canister 13.

The coupling device 20 serves a number of purposes. The coupling device 20 releasably attaches the upper and lower tubes 16 and 18, and the associated actuator rod segments 22 and 23, maintains the actuator rod segments 22 and 23 in position, and further centers the actuator rod segments 22 and 23 in the tubes 16 and 18 and aligns the actuator rod segment 23 with the rod segment 22 to provide an appropriate linkage. The coupling device 20 nevertheless allows the handle assembly 10 to be disassembled into a more compact form if desired for storage or maintenance.

Figure 7:
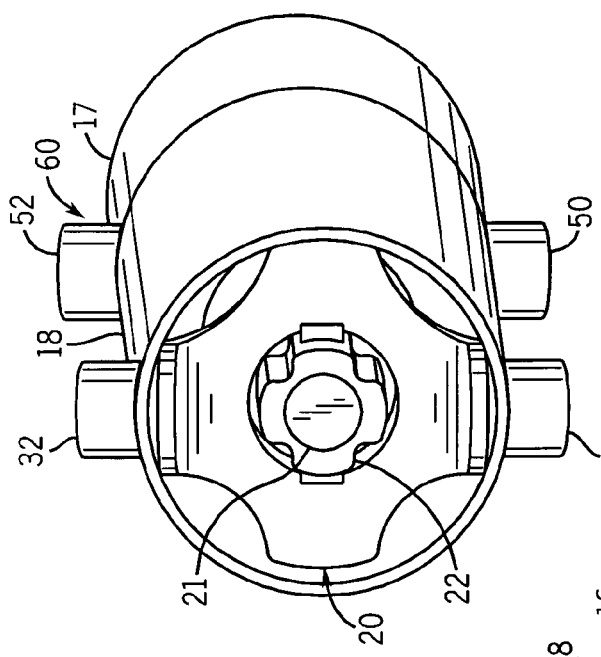
FIG. 7 is a perspective view of a portion of the shaft assembly, illustrating how multiple coupling members can be used.

Referring next to FIG. 7, and also to FIG. 2, it can be seen that more than one coupling device 20 and 60 can be used to connect multiple tubes and components together. Here, as described above with reference to FIG. 2, the upper and lower tube assembly 16 and 18 are coupled together with a first coupling device 20, while a tubular connector portion 17 is connected to a lower end of the lower tube 18 with a second coupling device 60. As described above, the tubular connector portion 17 can be part of a housing 15 for a spray canister 13. However, other types of spray activated devices and cleaning devices could also be attached to the handle assembly 12 as described.

Various alternative mechanical methods for attaching the actuator rod segments 22 and 23 (e.g. threads) will be apparent to those of skill in the art. Additionally, while the invention has been described with reference to a spraying device, various other dispensers and cleaning apparatuses which require an internal rod or tube either for dispensing a fluid or actuating a canister could also be constructed using the described coupling device.

Hence, it should be appreciated that various modifications of the above described embodiment may be made without departing from the spirit or scope of the following claims. Thus, the claims should be looked to in order to assess the full scope of the invention.

INDUSTRIAL APPLICABILITY

Disclosed are improved coupling devices for detachably coupling two tubes while simultaneously aligning and guiding an axially movable rod extending therein, such devices being particularly desirable for use with remote sprayers.

We claim:

1. A detachable tube assembly, comprising:
   first and second tubes, the first tube having at least one radial aperture which is alignable with a radial aperture of the second tube when the first and second tubes are telescoped together; and
   a coupler, the coupler comprising:
     a base portion having a central aperture suitable for receiving and guiding a rod therein;
     at least one flexible arm coupled to the base portion; and
     a first radial extension extending outwardly from the arm, the extension being sized and dimensioned to be received in aligned radial apertures of both the first and second tubes to thereby couple the tubes together;
   wherein a rod is axially movably received in the central aperture.

2. The detachable tube assembly of claim 1, wherein the coupler further comprises a second flexible arm coupled to the base portion having a second radial extension extending outwardly there from.

3. The detachable tube assembly of claim 2, wherein the rod includes a radial barb for limiting the extent of axial movement of the rod in the central aperture, and the rod extends into the first and second tubes.

4. The detachable tube assembly of claim 3, wherein the barb is configured to facilitate assembling the rod with the coupler by movement of the rod in one axial direction relative to the central aperture.

5. The detachable tube assembly of claim 2, wherein the rod also has a washer mounted thereon to facilitate centralization of the rod along a central axis of one of the tubes.

6. The detachable tube assembly of claim 1, wherein the coupler is U-shaped in front view.

7. A coupling device for detachably connecting first and second tubes, the first tube having at least one radial aperture which is alignable with a radial aperture of the second tube when the first and second tubes are telescoped together, the coupling device comprising:
   a base including a central aperture suitable for receiving and guiding a rod therein;
   at least one flexible arm coupled to the base; and
   a radial extension extending outwardly from the arm;
   wherein a rod is axially movably received in the central aperture.

8. A spraying device, comprising;
   a trigger assembly;
   a first tube having two radial holes;
   a second tube having two radial holes;
   the first and second tubes being telescoped into one another with the radial holes of the first tube being in alignment with the radial holes of the second tube;

an actuator rod assembly coupled to the trigger assembly and extending through the first and second tubes in an axially movable fashion;

a spray canister assembly linked to the second tube and adapted to be activated by the actuator rod; and a coupling device positioned in a tube adjacent a junction between the first and second tubes, the coupling device comprising a base section having a central aperture, first and second flexible arms extending from the base section, and first and second radial extensions extending from the first and second flexible arms, respectively;

whereby the actuator rod also extends through the central aperture in axially movable fashion and the radial extensions extend into the two radial holes of the first tube and the two radial holes of the second tube.

* * * * *